United States Patent [19]

Matsuda et al.

[11] Patent Number: 5,169,213
[45] Date of Patent: Dec. 8, 1992

[54] METHOD FOR TRACTION CONTROL OF VEHICLE

[75] Inventors: Shohei Matsuda; Jiro Suzuki; Kazutoshi Tashima; Takeshi Kojima, all of Saitama, Japan

[73] Assignee: Honda Giken Kogyo Kabushiki Kaisha, Tokyo, Japan

[21] Appl. No.: 584,661

[22] Filed: Sep. 19, 1990

[30] Foreign Application Priority Data

Sep. 20, 1989 [JP] Japan .................................... 244861

[51] Int. Cl.⁵ ............................................. B60T 8/32
[52] U.S. Cl. ................................. 303/113.2; 180/197;
303/93; 303/103; 303/106; 303/110; 303/119.1;
364/426.03
[58] Field of Search ...................... 303/93, 110, 95, 96,
303/97, 99, 100, 102, 103, 104, 105, 106, 107,
108, 109, 111, 113 TR, 113 TB, 119 R; 180/197,
233, 244; 364/426.03, 426.01, 426.02

[56] References Cited

U.S. PATENT DOCUMENTS

| | | | |
|---|---|---|---|
| 3,893,535 | 7/1975 | Burckhardt et al. ............. | 303/96 X |
| 4,033,634 | 7/1977 | Arai et al. ...................... | 303/103 |
| 4,054,328 | 10/1977 | Leiber et al. ................... | 303/103 |
| 4,209,203 | 6/1980 | Brearley ......................... | 303/103 X |
| 4,225,195 | 9/1980 | Weise et al. .................... | 303/103 X |
| 4,585,280 | 4/1986 | Leiber ............................ | 303/105 X |
| 4,637,663 | 1/1987 | Matsuda .......................... | 303/97 X |
| 4,740,040 | 4/1988 | Arikawa .......................... | 303/97 X |
| 4,921,314 | 5/1990 | Braschel et al. ................. | 303/110 |
| 4,936,404 | 6/1990 | Matsumoto et al. .............. | 303/96 X |
| 4,962,824 | 10/1990 | Hagiya ............................ | 180/197 |
| 4,967,866 | 11/1990 | Maehara ......................... | 180/197 |
| 4,985,838 | 1/1991 | Hashiguchi et al. .............. | 180/197 X |
| 4,985,839 | 1/1991 | Dominke ........................ | 303/103 X |
| 4,998,782 | 3/1991 | Thatcher et al. ................. | 303/110 |
| 5,095,436 | 3/1992 | Sato ................................ | 180/197 X |

FOREIGN PATENT DOCUMENTS

| | | | |
|---|---|---|---|
| 222963 | 9/1988 | European Pat. Off. . | |
| 0419258 | 3/1991 | European Pat. Off. ..... | 303/113 TR |
| 2078323 | 1/1982 | United Kingdom ............... | 180/197 |

Primary Examiner—Douglas C. Butler
Attorney, Agent, or Firm—Armstrong & Kubovcik

[57] ABSTRACT

A method for traction control of a vehicle, includes detecting a slipping tendency of a drive wheel in a driven state, and controlling the braking force of a drive wheel brake device in an increasing and decreasing manner in accordance with the degree of the detected slipping tendency, wherein a rapid increase mode of rapidly increasing the braking force of the drive wheel brake device and a slow increase mode of slowly increasing the braking force can be switched from one to the other, so that at an initial stage in increasing the braking force of the drive wheel brake device on the basis of the decision that the drive wheel is in an excessive slipping tendency, the braking force is increased in the rapid increase mode.

5 Claims, 3 Drawing Sheets

METHOD FOR TRACTION CONTROL OF VEHICLE

FIELD OF THE INVENTION

The present invention relates to a method for traction control of a vehicle. In particular, the present invention relates to detecting a slipping tendency of a drive or traction wheel in a driven state, and controlling the braking force of a drive wheel brake device in an increasing and decreasing manner in accordance with the degree of the slipping tendency.

RELATED ART

In a conventional method, the braking force of the drive wheel brake device is increased at a given rate, when the drive wheel is in an excessive slipping tendency. An example of such a traction control method is shown in U.S. Pat. No. 3,893,535.

A hydraulic pressure within a hydraulic pressure control circuit including the drive wheel brake device is equal to the atmospheric pressure at the start of the traction control, and a long time is required to increase the hydraulic pressure within the hydraulic pressure control circuit from such condition to a level in which the braking force is exhibited, resulting in inferior responsiveness.

SUMMARY OF THE INVENTION

The present invention has been accomplished in view of the above disadvantages, and it is an object of the present invention to provide a method for traction control of a vehicle, wherein the responsiveness of control at the start of the traction control can be enhanced.

With the method according to the present invention, it is arranged to switch the braking force increase mode from a rapid increase mode of rapidly increasing the braking force of the drive wheel brake device to a slow increase mode of slowly increasing the braking force, so that at an initial stage in increasing the braking force of the drive wheel brake device on the basis of the decision that the drive wheel is in an excessive slipping tendency, the braking force is increased in the rapid increase mode.

With the above method, it is possible to enhance the responsiveness of control in a hydraulic circuit including the drive wheel brake device by rapidly increasing the braking force.

According to the present invention, the rapid increase mode of rapidly increasing the braking force of the drive wheel brake device and the slow increase mode of slowly increasing the braking force can be switched over from one to the other, so that at an initial stage in increasing the braking force of the drive wheel brake device on the basis of the decision that the drive wheel is in an excessive slipping tendency, the braking force is increased in the rapid increase mode. Therefore, it is possible to provide an appropriate braking force increasing control according to the situation and to enhance the responsiveness of control at the start of the traction control.

DESCRIPTION OF THE PREFERRED EMBODIMENT

Figure 1:
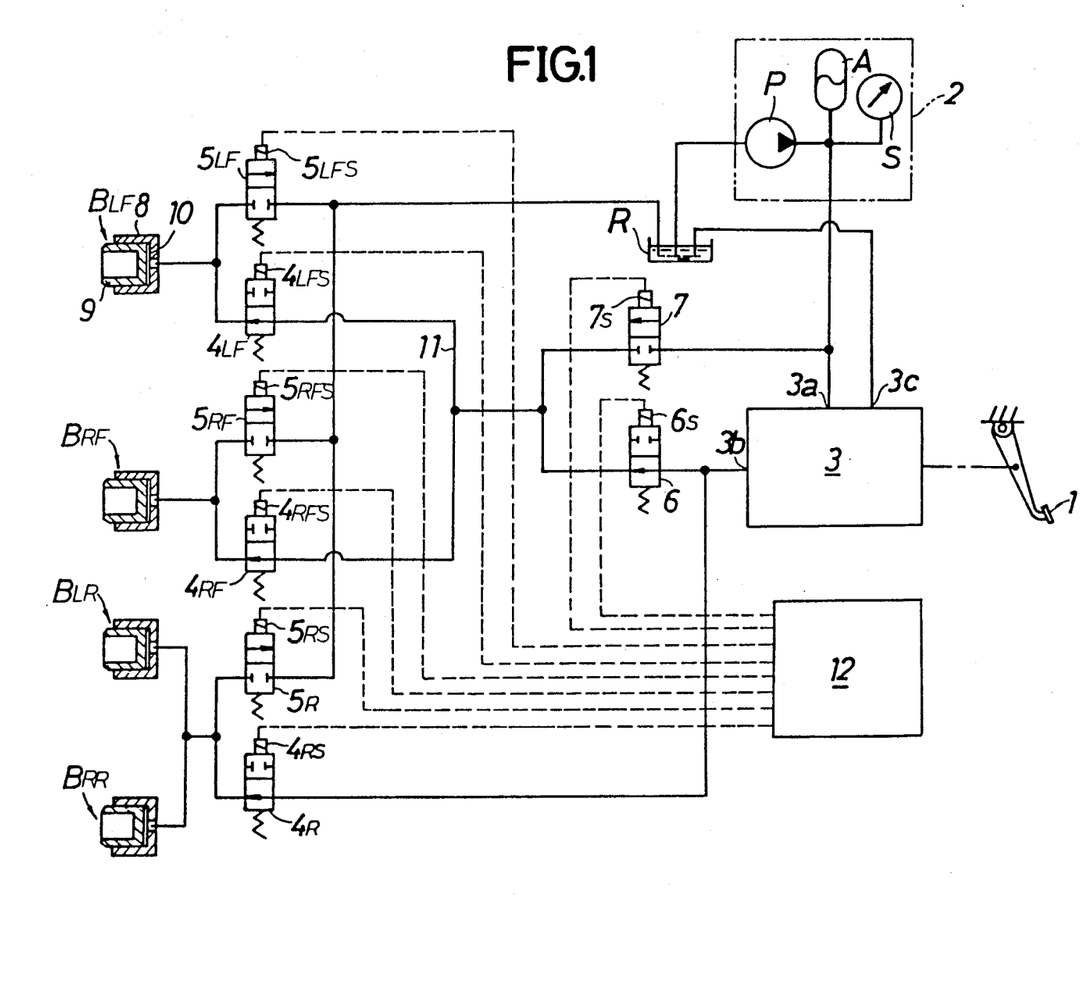
FIG. 1 is a schematic diagram of a traction control system in accordance with one embodiment of the instant invention.

The present invention will now be described with reference to the accompanying drawings by way of an embodiment in which the present invention is applied to a front engine and front drive vehicle. Referring first to FIG. 1, a left drive wheel brake device $B_{RF}$ and a right drive wheel brake device $B_{LF}$ are mounted on left and right front wheels of the vehicle, respectively, which serve as drive or traction wheels, and a left driven wheel brake device $B_{LR}$ and a right driven wheel brake device $B_{RR}$ are mounted on left and right rear wheels serving as driven or follower wheels, respectively. A hydraulic braking pressure generating means 3 is connected to a brake pedal 1 and capable of controlling the hydraulic pressure from a hydraulic pressure supply source 2 in accordance with the amount of brake pedal 1 depressed to produce a hydraulic pressure. During normal braking, the hydraulic pressure produced by the hydraulic braking pressure generating means 3 is applied to each of the brake devices $B_{LF}$, $B_{RF}$, $B_{LR}$ and $B_{RR}$. The hydraulic braking pressure of the brake devices $B_{LF}$, $B_{RF}$, $B_{LR}$ and $B_{RR}$ can be maintained or reduced to effect an anti-lock control through inlet solenoid valves $4_{LF}$ and $4_{RF}$ and outlet solenoid valves $5_{LF}$ and $5_{RF}$ mounted in independent association with the drive wheel brake devices $B_{LF}$ and $B_{RF}$ and an inlet solenoid valve $4_R$ and an outlet solenoid valve $5_R$ which are commonly associated with the driven wheel brake devices $B_{LR}$ and $B_{RR}$. In addition, the hydraulic braking pressure of the drive wheel brake devices $B_{LF}$ and $B_{RF}$ can be increased to effect traction control through a traction-controlling normally-opened solenoid valve 6 and normally-closed solenoid valve 7 as well as the inlet solenoid valves $4_{LF}$ and $4_{RF}$ and the outlet solenoid valves $5_{LF}$ and $5_{RF}$.

The hydraulic pressure supply source 2 comprises a hydraulic pump P for pumping a working oil from a reservoir R, an accumulator A connected to the hydraulic pump P, and a pressure switch S for controlling the operation of the hydraulic pump P.

The hydraulic braking pressure generating means 3 has an input port $3a$ leading to the hydraulic pressure supply source 2, an output port $3b$, and a release port $3c$ leading to the reservoir R, and is constructed so that a hydraulic pressure according to the amount of brake pedal 1 depressed may be delivered from the output port $3b$ by switch-over of a communication between the output port $3b$ and the input port $3a$ and a communication between the output port $3b$ and the release port $3c$ in response to the depression of the brake pedal 1.

Each of the brake devices $B_{LF}$, $B_{RF}$, $B_{LR}$ and $B_{RR}$ comprises a cylinder 8 and a braking piston 9 slidably received in the cylinder 8, and is constructed to exhibit a braking force by movement of the braking piston 9 according to the hydraulic pressure applied to a hydraulic braking pressure chamber 10 defined between the cylinder 8 and the piston 9.

The solenoid valves $4_{LF}$ and $5_{LF}$ are connected in parallel to hydraulic chamber 10 of drive wheel brake device $B_{LF}$. Solenoid valves $4_{RF}$ and $5_{RF}$ are connected in parallel to hydraulic braking pressure chamber 10 in the drive wheel brake device $B_{RF}$ Inlet solenoid valve $4_R$ and the outlet solenoid valve $5_R$ are connected in parallel to the driven wheel brake devices $B_{LR}$ a $B_{RR}$. The inlet solenoid valves $4_{LF}$, $4_{RF}$ and $4_R$ are normally-opened solenoid valves which are closed during excitation of solenoids $4_{LFS}$, $4_{RFS}$ and $4_{RS}$, and the outlet solenoid valves $5_{LF}$, $5_{RF}$ and $5_R$ are normally-closed solenoid valves which are opened during excitation of solenoids $5_{LFS}$, $5_{RFS}$ and $5_{RS}$. Moreover, the inlet solenoid valves $4_{LF}$ a $4_{RF}$ are interposed between the hydraulic braking pressure chambers 10 in the drive wheel brake devices $B_{LF}$ a $B_{RF}$ and an oil passage 11, and the outlet solenoid valves $5_{LF}$ and $5_{RF}$ are interposed between the hydraulic braking pressure chambers 10 in the drive wheel brake devices $B_{LF}$ a $B_{RF}$ and the reservoir R. The inlet solenoid valve $4_R$ is interposed between the hydraulic braking pressure chambers 10 in the driven wheel brake devices $B_{LR}$ and $B_{RR}$ and the output port 3b of the hydraulic braking pressure generating means 3, and the outlet solenoid valve $5_R$ is interposed between the hydraulic braking pressure chambers 10 in the driven wheel brake devices $B_{LR}$ a $B_{RR}$ and the reservoir R. The traction-controlling normally-opened solenoid valve 6 is interposed between the oil passage 11 and the output port 3b of the hydraulic braking pressure generating means 3, and the traction-controlling normally-closed solenoid valve 7 is interposed between the oil passage 11 and the hydraulic pressure supply source 2.

The energization and deenergization of the solenoids $4_{LFS}$, $4_{RFS}$, $4_{RS}$, $5_{LFS}$, $5_{RFS}$, $5_{RS}$, $6_S$, $7_S$ in the solenoid valves $4_{LF}$, $4_{RF}$ and $4_R$, $5_{LF}$, $5_{RF}$ and $5_R$, 6 and 7 are controlled by a control means 12, and in a normal condition, solenoids $4_{LFS}$, $4_{RFS}$, $4_{RS}$, $5_{LFS}$, $5_{RFS}$, $5_{RS}$, $6_S$ and $7_S$ are in their deenergized states. In an anti-lock brake control during braking, the inlet solenoid valve $4_{LF}$, $4_{RF}$, $4_R$, corresponding to a wheel which is about to be locked, is brought into a closed state, thereby suppressing the increasing of the braking force to avoid the wheel becoming locked, but when the wheel is still about to be brought into its locked state, the corresponding outlet solenoid valve $5_{LF}$, $5_{RF}$ and $5_R$ becomes a communication state to provide a reduction in braking force, thereby eliminating the locking tendency of the wheel.

When the drive wheel is about to slip excessively, the energization and deenergization of the solenoids $6_S$ and $7_S$ of the traction-controlling normally-opened solenoid valve 6 and normally-closed solenoid valve 7 as well as the solenoids $4_{LFS}$ and $4_{RFS}$ in the inlet solenoid valves $4_{LF}$ and $4_{RF}$ and the solenoids $5_{LFS}$ and $5_{RFS}$ in the outlet solenoid valves $5_{LF}$ and $5_{RF}$ are controlled in a switchover manner by the control means 12, thereby controlling the braking force of the left and right front wheel brake devices $B_{LF}$ and $B_{RF}$ in an increasing or decreasing manner.

When the solenoids $6_S$ and $7_S$ are energized, with the solenoids $4_{LFS}$, $4_{RFS}$, $5_{LFS}$ and $5_{RFS}$ kept deenergized, to close the normally-opened solenoid valve 6 and to open the normally-closed solenoid valve 7, the hydraulic pressure from the hydraulic pressure supply source 2 is applied to the braking hydraulic pressure chambers 10 in the drive wheel brake devices $B_{LF}$ and $B_{RF}$ to rapidly increase the braking force. When the solenoids $4_{LFS}$ and $4_{RFS}$ are intermittently energized to intermittently open the inlet solenoid valves $4_{LF}$ and $4_{RF}$ with the solenoids $5_{LFS}$ and $5_{RFS}$ deenergized to close the outlet solenoid valves $5_{LF}$ and $5_{RF}$ in a condition of the normally-opened solenoid valve 6 closed and the normally-closed solenoid valve 7 opened, the hydraulic pressure in the hydraulic braking pressure chambers 10 are slowly increased to slowly increase the braking force from each of the brake devices $B_{LF}$ and $B_{FR}$. When the solenoids $4_{LFS}$ and $4_{RFS}$ are energized and the solenoids $5_{LFS}$ and $5_{RFS}$ are deenergized to close the inlet solenoids valves $4_{LF}$ and $4_{RF}$ and the outlet solenoid valves $5_{LF}$ and $5_{RF}$ with the normally-opened solenoids valve 6 closed and the normally-closed solenoid valve 7 opened, the hydraulic pressure in the hydraulic braking pressure chamber 10 is maintained to keep the braking force from each of the brake devices $B_{LF}$ and $B_{RF}$. Further, when the solenoids $4_{LFS}$ and $4_{RFS}$ are energized to close the inlet solenoid valves $4_{LF}$ and $4_{RF}$ and the solenoids $5_{LFS}$ and $R_{FS}$ are energized to open the outlet solenoid valves $5_{LF}$ and $5_{RF}$ with the normally-opened solenoid valve 6 closed and the normally-closed solenoid valve 7 opened, the hydraulic pressure in the hydraulic braking pressure chambers 10 can be rapidly released to rapidly decrease the braking force from each of the brake devices $B_{LF}$ and $B_{RF}$. When the solenoids $5_{LFS}$ and $5_{RFS}$ are intermittently energized to intermittently open the outlet solenoid valves $5_{LF}$ and $5_{RF}$ with the solenoids $4_{LFS}$ and $4_{RFS}$ energized to close the inlet solenoid valves $4_{LF}$ and $4_{RF}$ in a condition of the normally-opened solenoid valve 6 being closed and the normally-closed solenoid valve 7 being opened, the hydraulic pressure in the hydraulic braking pressure chambers 10 can be slowly released to slowly decrease the braking force from each of the brake devices $B_{LF}$ and $B_{RF}$.

In other words, in this hydraulic pressure control circuit, a rapid increase mode of rapidly increasing the braking force, a slow increase mode of slowly increasing the braking force, a maintaining mode of maintaining the braking force, a rapid decrease mode of rapidly decreasing the braking force and a slow decrease mode of slowly decreasing the braking force can be switched over from one to the other to control the braking force in the increasing and decreasing manner by controlling the energization and deenergization of the individual solenoids $4_{LFS}$, $4_{RFS}$, $5_{LFS}$, $5_{RFS}$, $6_S$ and $7_S$ in a switchover manner during a traction control operation, as shown in Table 1 (below).

TABLE 1

Figure 2:
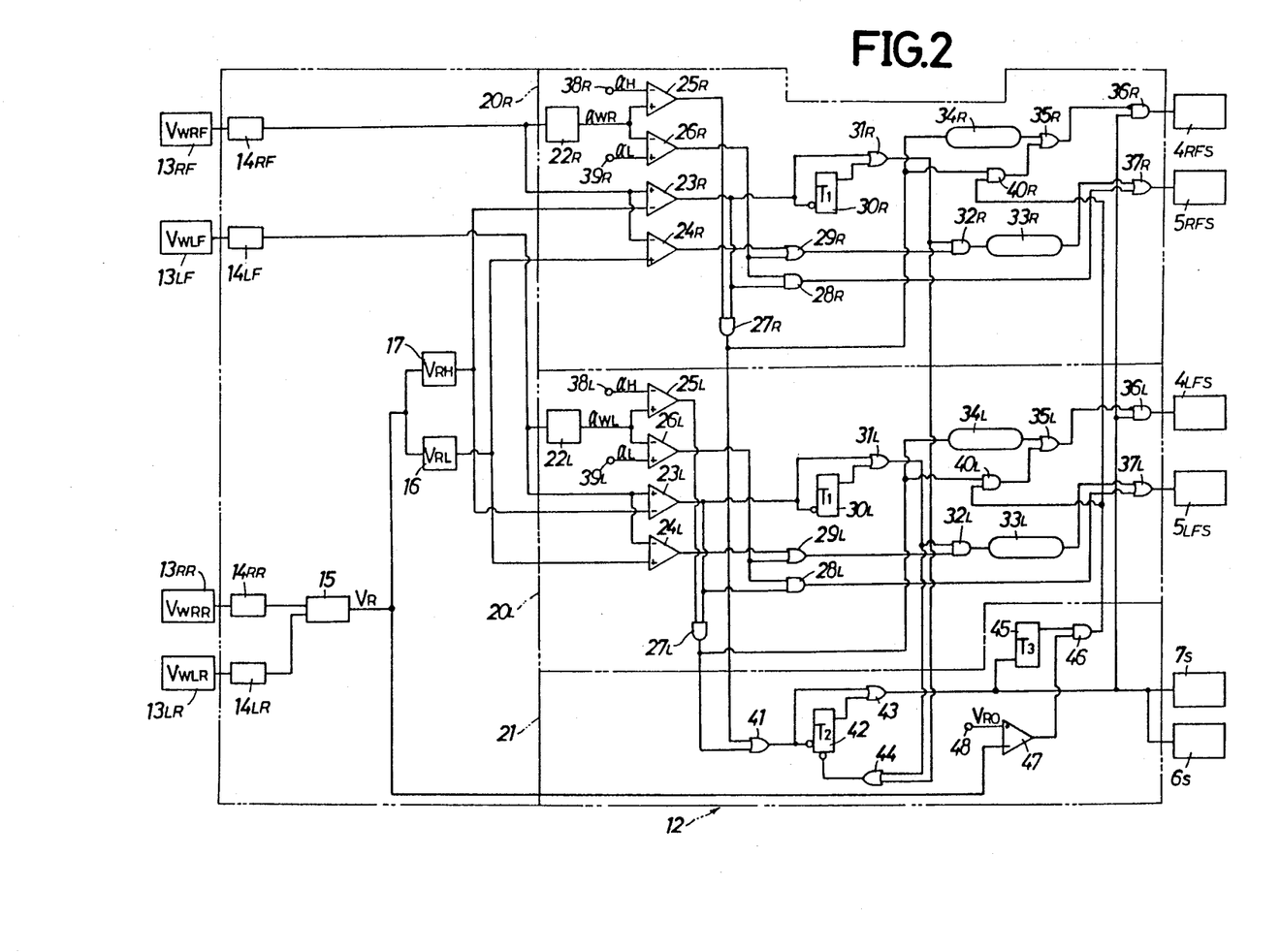
FIG. 2 is a schematic diagram of the control means of FIG. 1.

| CONTROL MODE | SOLENOID | | | | | |
|---|---|---|---|---|---|---|
| | $6_S$ | $7_S$ | $4_{LFS}$ | $4_{RFS}$ | $5_{LFS}$ | $5_{RFS}$ |
| Rapid inc. mode | En | En | De | | De | |
| slow inc. mode | En | En | Int. En | | De | |
| Ma. mode | En | En | En | | De | |
| rapid dec. mode | En | En | En | | En | |
| slow dec. mode | En | En | En | | Int. En | | inc. = increase
dec. = decrease
Ma. = maintaining
En = Energization
De = Deenergization
Int. En = Intermittent Energization Referring to FIG. 2 illustrating an arrangement of that section of the control means 12 which corresponds to the traction control, wheel speed detectors $13_{LF}$ and $13_{RF}$ for detecting the speeds of the left and right drive wheels, (i.e., the left and right front wheels), and wheel speed detectors $13_{LR}$ and $13_{RR}$ for detecting the speeds of the left and right driven wheels, i.e., the left and right rear wheels) are connected to the control means 12. The control means 12 controls, in a switchover manner, the energization and deenergization of the solenoids $4_{LFS}$ and $4_{RFS}$ of the inlet solenoid valves $4_{LF}$ and $4_{RF}$ and the solenoids $5_{LFS}$ and $5_{RFS}$ of the outlet solenoid valves $5_{LF}$ and $5_{RF}$ associated with the left and right drive wheel brake devices $B_{LF}$ and $B_{RF}$ as well as the solenoid $6_S$ of the traction-controlling normally-opened solenoid valve 6 and the solenoid $7_S$ of the traction-controlling normally-closed solenoid valve 7 by detected values provided in their wheel speed detectors $13_{LF}$, $13_{RF}$, $13_{LR}$ and $13_{RR}$.

The control means 12 comprises filters $14_{LF}$, $14_{RF}$, $14_{LR}$ and $14_{RR}$ independently connected to the wheel speed detectors $13_{LF}$, $13_{RF}$, $13_{LR}$ and $13_{RR}$, respectively, a high select circuit 15 connected to the filters $14_{LR}$ and $14_{RR}$, a lower-side reference speed determining circuit 16 and a higher-side reference speed determining circuit 17 which are connected to the high select circuit 15, a left front wheel braking-force control section $20_L$ connected to the filter $14_{LF}$ and the lower-side and higher-side reference speed determining circuits 16 and 17 in correspondence to the solenoids $4_{LFS}$ and $5_{LFS}$, a right front wheel braking-force control section $20_R$ connected to the filter $14_{RF}$ and the lower-side and higher-side reference speed determining circuits 16 and 17 in correspondence to the solenoids $4_{RFS}$ and $5_{RFS}$, and a common control section 21 commonly connected to the left and right front wheel braking force control sections $20_L$ and $20_R$ and connected to the solenoids $6_S$ and $7_S$.

Figure 3:
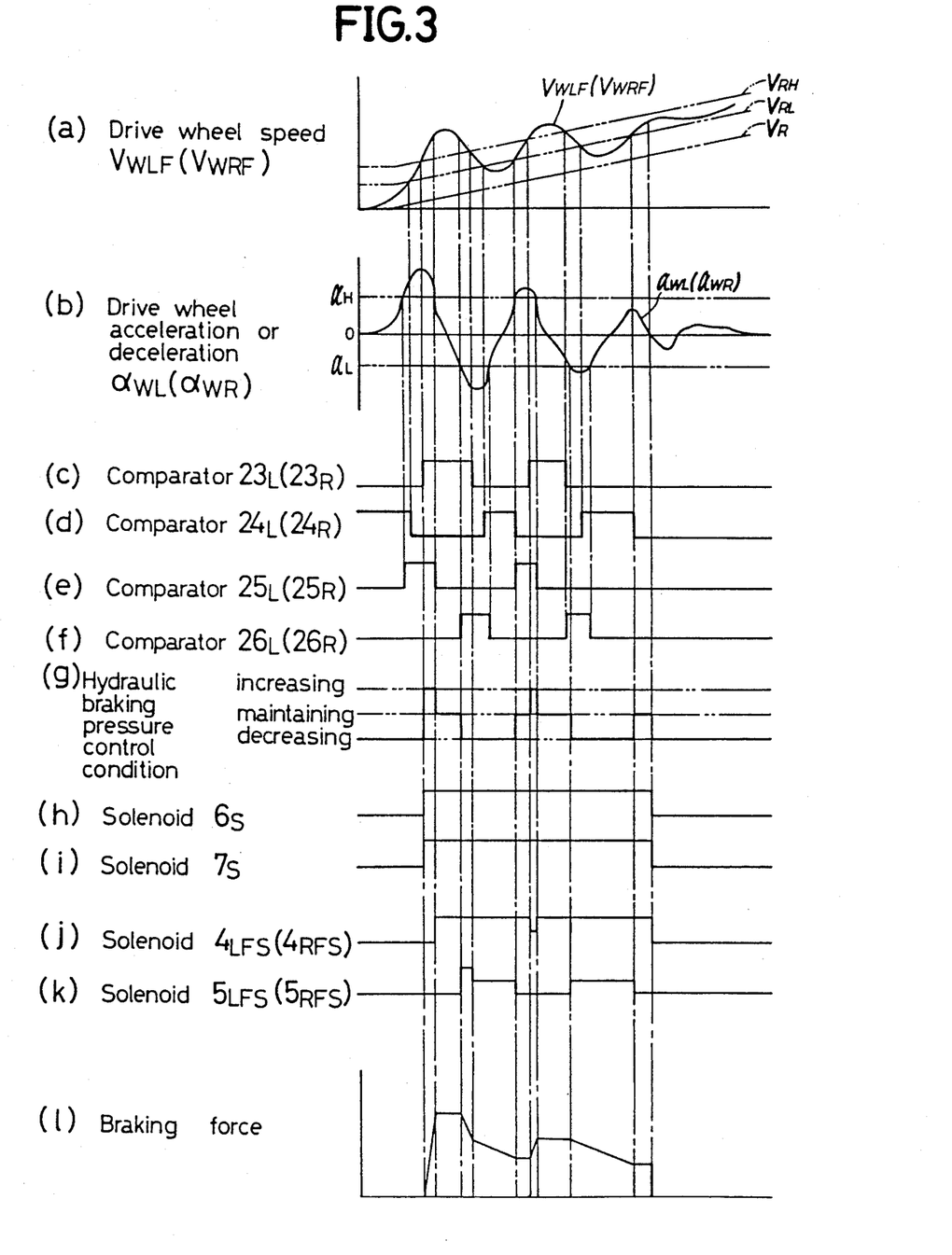
FIG. 3 is a timing diagram illustrating the embodiment.

Left and right driven wheel speeds $V_{WLR}$ and $V_{WRR}$ detected in the left and right driven wheel speed detectors $13_{LR}$ and $13_{RR}$ are cleared of noise in the filters $14_{LR}$ and $14_{RR}$ and inputted to the high select circuit 15. The high select circuit 15 selects the higher one of the left and right driven wheel speeds $V_{WLR}$ and $V_{WRR}$ as a vehicle speed $V_R$. The vehicle speed $V_R$ obtained in the high select circuit 15 is delivered to the lower-side and higher-side reference speed determining circuits 16 and 17. The lower-side reference speed determining circuit 16 determines a lower-side reference speed $V_{RL}$ as shown in FIG. 3(a) from the vehicle speed $V_R$ in accordance with an acceptable slippage of the drive wheels, and the higher-side reference velocity determining circuit 17 determines a higher-side reference speed $V_{RH}$ as shown in FIG. 3(a) from the vehicle speed $V_R$ on the basis of the decision that the drive wheels are excessively slipping.

Left and right drive wheel velocities $V_{WLF}$ and $V_{WRF}$ detected in the left and right drive wheel speed detectors $13_{LF}$ and $13_{RF}$ are cleared of noise in the filters $14_{LF}$ and $14_{RF}$ and inputted to the left and right front wheel braking-force control sections $20_L$ and $20_R$. The left and right front wheel braking-force control sections $20_L$ and $20_R$ have the same construction and hence, components of the left front wheel braking force control section $20_L$ will be described below using reference characters with a suffix L attached thereto, and components of the right front wheel braking force control section $20_R$ corresponding to those of the left front wheel braking force control section $20_L$ are only shown using reference characters with a suffix R attached thereto.

The left front wheel braking force control section $20_L$ comprises a differentiating circuit $22_L$ for differentiating the left drive wheel velocity $V_{WLF}$ filtered of noise in filter $14_{LF}$ and inputted thereto to calculate a drive wheel acceleration or deceleration $\alpha_{WL}$, four comparators $23_L$, $24_L$, $25_L$, and $26_L$, AND circuits $27_L$, $28_L$, $32_L$, $36_L$ and $40_L$, OR circuits $29_L$, $31_L$, $35_L$ and $37_L$, a timer $30_L$, and oscillator circuits $33_L$ and $34_L$.

In the comparator $23_L$, the left drive wheel speed $V_{WLF}$ is delivered from the filter $14_{LF}$ to a non-inverted input terminal of the comparator $23_L$, and the higher-side reference speed $V_{RH}$ is delivered from the higher-side reference speed determining circuit 17 to an inverted input terminal of the comparator $23_L$. Thus, if $V_{WLF} > V_{RH}$, then a higher level signal is produced from the comparator $23_L$. In the comparator $24_L$, the lower-side reference speed $V_{LR}$ is delivered from the lower-side reference determining circuit 16 to a non-inverted input terminal of the comparator $24_L$, and the left drive wheel velocity $V_{WLF}$ is delivered from the filter $14_{LF}$ to an inverted input terminal of the comparator $24_L$. Thus, a higher level signal is produced from the comparator $24_L$ when $V_{RL} > V_{WLF}$. In the comparator $25_L$ a left drive wheel acceleration or deceleration $\alpha_{WL}$ is delivered from the differentiating circuit $22_L$ to a non-inverted input terminal of the comparator $25_L$, and a given reference acceleration $\alpha_H$ is delivered from a reference terminal $38_L$ to an inverted input terminal of the comparator $25_L$. Thus, a higher level signal is produced from the comparator $25_L$ when $\alpha_{WL} > \alpha_H$. Further, in the comparator $26_L$, a given reference deceleration $\alpha_L$ is delivered from a reference terminal $39_L$ to a non-inverted input terminal of the comparator $26_L$, and a left drive wheel acceleration or deceleration $\alpha_{WL}$ is delivered from the differentiating circuit $22_L$ to an inverted input terminal of the comparator $26_L$. Thus, when $\alpha_L > \alpha_{WL}$ a high level signal is produced from the comparator $26_L$.

Output signals from the comparators $23_L$ and $25_L$ are applied to the AND circuit $27_L$. Thus, the AND circuit $27_L$ produces a high level signal when $V_{WLF} > V_{RH}$ and $\alpha_{WL} > \alpha_H$. This signal indicates that the left drive wheel is in an excessive slipping tendency. Output signals from the comparators $23_L$ and $26_L$ are applied to the AND circuit $28_L$. Thus, the AND circuit $28_L$ produces a high level signal when $V_{WLF} > V_{RH}$ and $\alpha_L > \alpha_{WL}$. Further, output signals from the comparators $24_L$ and $26_L$ are input to the OR circuit $29_L$ which produces a high level signal when $V_{RL} > V_{WLF}$ or $\alpha_L > \alpha_{WL}$.

The timer $30_L$ produces a high level signal which is sustained for a given time $T_1$ from a time point when the high level signal is input thereto. An output signal from the comparator $23_L$ is supplied in an inverted manner to the timer $30_L$. Further, the output signal from the timer $30_L$ is supplied to one of input terminals of the OR circuit $31_L$, and the output signal from the comparator $23_L$ is supplied to the other input terminal of the OR circuit $31_L$. Thus, when the output from the comparator $23_L$ is of a higher level, i.e., $V_{WLF} > V_{RH}$, or when the output from the comparator $23_L$ has become a lower level, i.e., the relation $V_{WLF} \leq V_{RH}$ has been established up to expiration of the given time $T_1$ from a time point when the output from the comparator $23_L$ becomes a low level, the OR circuit $31_L$ produces a higher level signal.

The output signals from the OR circuits $29_L$ and $31_L$ are supplied to the AND circuit $32_L$. Thus, when both of the outputs from the OR circuits $29_L$ and $31_L$ are of a higher level, i.e., when $V_{RL} > V_{WLF}$, or $\alpha_L > \alpha_{WL}$, and also when $V_{WLF} > V_{RH}$, or when $V_{WLF} V_{RH}$ for the given time $T_1$ from its establishment, the AND circuit $32_L$ produces a higher level signal.

The output signal from the AND circuit $32_L$ is applied to the oscillator circuit $33_L$. The oscillator circuit $33_L$ produces an oscillation signal alternately repeating high and low level states, in response to the high level signal inputted thereto from the AND circuit $32_L$. The signal from the oscillator circuit $3_L$ is supplied to one of input terminals of the OR circuit $37_L$. The output signal from the AND circuit $28_L$ is supplied to the other input terminal of the OR circuit $37_L$. Thus, the OR circuit $37_L$ produces a signal which becomes a high level in response to the high level signal produced from the AND circuit $28_L$ when $V_{WLF} > V_{RH}$ and $\alpha_L > \alpha_{WL}$ and which is of a high level in a high level state of an oscillation signal produced from the oscillator circuit $33_L$, when the output from the AND circuit $28_L$ is of a low level, i.e., when $V_{WLF} \leq V_{RH}$ or $\alpha_L \leq \alpha_{WL}$. An output terminal of the OR circuit $37_L$ is connected to the solenoid $5_{LFS}$.

The output signal from the AND circuit $27_L$ is supplied to the oscillator circuit $34_L$. When $V_{WLF} > V_{RH}$ and $\alpha_{WL} > \alpha_H$, the oscillator circuit $34_L$ produces an oscillation signal alternately repeating higher and lower level states, in response to reception of the higher level signal from the AND circuit $27_L$. This signal from the oscillator circuit $34_L$ is applied to one of input terminals of the OR circuit $35_L$. An output signal from the OR circuit $35_L$ is invertedly supplied to one of input terminals of the AND circuit $36_L$ whose output terminal is connected to the solenoid $4_{LFS}$.

The output signal from the AND circuit $27_L$ is supplied to one of input terminals of the AND circuit $40_L$, and an output signal from the AND circuit $40_L$ is supplied to the other input terminal of the OR circuit $35_L$.

The common control section 21 comprises OR circuits 41, 43 and 44, timers 42 and 45, an AND circuit 46 and a comparator 47.

Output signals from the AND circuits $27_L$ and $27_R$ in the left and right wheel braking-force control sections $20_L$ and $20_R$ are supplied to the OR circuit 41. When at least one of the AND circuits $27_L$ and $27_R$ produces a higher level signal, i.e., in at least one of two conditions: a condition where the left drive wheel is in an excessive slipping tendency and relations $V_{WLF} > V_{RH}$ and $\alpha_{WL} > \alpha_H$ are established, and a condition where the right drive wheel is in an excessive slipping tendency and relations $V_{WRF} > V_{RH}$ and $\alpha_{WR} > \alpha_H$ are established, the OR circuit 41 produces a high level signal.

The output signal from the OR circuit 41 is invertedly supplied to the timer 42 and to one of input terminals of the OR circuit 43. The timer 42 produces a high level signal which is sustained for a given time $T_2$, when a high level signal is inputted thereto, i.e., in response to the falling of the output signal from the OR circuit 41. The output signal from the timer 42 is applied to the other input terminal of the OR circuit 43. Thus, as long as at least one of the left and right drive wheels has an excessive slipping tendency and until expiration of the given time $T_2$ from the elimination of such an excessive slipping tendency, the OR circuit 43 produces a high level signal. An output terminal of the OR circuit 43 is connected to the solenoids $6_S$ and $7_S$.

The output signals from the OR circuits $31_L$ and $31_R$ in the left and right front wheel braking-force control sections $20_L$ and $20_R$ are inputted to the OR circuit 44, and an output signal from the OR circuit 44 is invertedly supplied to a reset input terminal of the timer 42. Thus, the timer 42 is reset when both of the output signals from the OR circuits 31L and 31R are brought into a lower level.

It should be noted that the output signal from the OR circuit 43 is also inputted to the other input terminals of the AND circuits $36_L$ and $36_R$ in the left and right front wheel braking-force control sections $20_L$ and $20_R$. When the output signals from the OR circuits $35_L$ and $35_R$ are of a low level and the output signal from the OR circuit 43 is of a high level, the AND circuits $36_L$ and $36_R$ produce a high level signal, thereby exciting the solenoids $4_{LFS}$ and $4_{RFS}$.

In addition, the output signal from the OR circuit 43 is also inputted to the timer 45 which produces a high level signal which is sustained for a given time $T_3$ from a time point when a high level signal is inputted thereto. The output signal from the timer 45 is applied to one of input terminals of the AND circuit 46. An output signal from the comparator 47 is applied to the other input terminal of the AND circuit 46. A reference signal corresponding to a reference vehicle speed $V_{RO}$, e.g., 15 to 20 km/hr is inputted to a non-inverted input terminal of the comparator 47, and a vehicle speed $V_R$ is inputted from the high select circuit 15 to an inverted input terminal of the comparator 47. When the vehicle speed $V_R$ is equal to or less than the reference vehicle speed $V_{RO}$, the comparator 47 produces a high level signal. Thus, when the vehicle speed $V_R$ is equal to or less than the reference vehicle speed $V_{RO}$, the AND circuit 46 produces a higher level signal until expiration of the given time $T_3$ which starts from a time point when the output from the OR circuit 41 is brought into a high level, i.e., when at least one of the left and right drive wheels enters an excessive slipping tendency.

The output signal from the AND circuit 46 is applied to the other input terminals of the AND circuits $40_L$ and $40_R$ in the left and right front wheel braking-force control sections $20_L$ and $20_R$. Thus, when the vehicle speed $V_R$ is equal to or less than the reference vehicle speed $V_{RO}$ in the course of the given time $T_3$ elapsed from a time point when at least one of the left and right drive wheels enters the excessive slipping tendency and when the left and right drive wheels are still in an excessive slipping tendency, each of the AND circuits $40_L$ and $40_R$ then produces a high level signal.

In the above-described control means 12, the given time $T_1$ in the timers $30_L$ and $30_R$, the given time $T_2$ in the timer 42 and the given time $T_3$ in the timer 45 are set as follows: (a) The given time $T_2$ is set in correspondence to a normal time within which the excessive slipping of the drive wheel can be eliminated. For example, the given time $T_2$ is 1,000m sec. The given time $T_2$ is a time for keeping the traction-controlling normally-opened and normally-closed solenoid valves 6 and 7 energized in order to permit a traction control swiftly responsive to occurrence of a subsequent excessive slipping after the elimination of the excessive slipping tendency of the drive wheel. (b) The given time $T_1$ is shorter than the given time $T_2$ and is set, for example, at 500m sec. If the solenoids $6_S$ and $7_S$ are kept energized for a relatively long time $T_2$ (1,000m sec.) to accommodate to the subsequent excessive slipping as described above, the accommodation is impossible when an accelerator is rapidly returned within such time $T_2$ to rapidly reduce the drive wheel speeds $V_{WLF}$ and $V_{WRF}$ to the vehicle velocity $V_R$ or when a braking is conducted. The period of time is almost constant from a point when the left and right drive wheel speeds $V_{WLF}$ and $V_{WRF}$ become equal to or less than the higher-side reference velocity $V_{RH}$ ($V_{WLF} \leq V_{RH}$ and $V_{WRF} \leq V_{RH}$) to a point when the drive wheel enters the subsequent excessive slipping tendency and hence, the given time $T_1$ is set at a level enough to cover such period of time.

Moreover, the OR circuits $30_L$ and $30_R$ have their outputs each brought into a low level after a lapse of the time $T_1$ from a point when $V_{WLF} \leq V_{RH}$ and $V_{WRF} \leq V_{RH}$. When the outputs from the OR circuits $31_L$ and $31_R$ become the lower level, the timer 42 is reset. When at least one of the left and right drive wheels is in a relation $V_{WLF} > V_{RH}$ or $V_{WRF} > V_{RH}$, the timer 42 is not reset, and the solenoids $6_S$ and $7_S$ are kept energized. Therefore, the given time $T_1$ can be set to a relatively short period of time. Taking them into consideration, the given time $T_1$ is set, for example, at 500m sec. (c) The given time $T_3$ is set, for example, at 60m sec. The given time $T_3$ is set as a time required to increase the hydraulic pressure in the hydraulic braking pressure chambers 10 in the left and right drive wheel brake devices $B_{LF}$ and $B_{RF}$ from atmospheric pressure to a level at which the braking force acts. Here, the timer 45 is operated after an excessive slipping tendency occurs in either one of the left or right drive wheels. For the given time $T_3$ for example, 60m sec is set as a time sufficient to increase the hydraulic pressure in the hydraulic braking pressure chamber 10 in each brake device $B_{LF}$, $B_{RF}$ from atmospheric pressure to a level at which the braking force acts, even when the left and right drive wheels concurrently produce the excessive slipping tendency as well as when the left and right drive wheels produce the excessive slipping tendency out of phase.

The operation of this embodiment will be described below with reference to FIG. 3. When the drive wheel speed $V_{WLF}$ or $V_{WRF}$ varies as shown in FIG. 3(a), and the drive wheel acceleration or deceleration $\alpha_{WL}$ or $\alpha_{WR}$ varies as shown in FIG. 3(b), the output from the comparator $23_L$ or $23_R$ is as shown in FIG. 3(c); the output from the comparator $24_L$ or $24_R$ is as shown in FIG. 3(d); the output from the comparator $25_L$ or $25_R$ is as shown in FIG. 3(e); and the output from the comparator $26_L$ or $26_R$ is as shown in FIG. 3(f). The control condition of the hydraulic braking pressure to be controlled in accordance with the foregoing is as shown in FIG. 3(g). The energization and deenergization of the solenoids $6_S$ and $7_S$ in accordance with such control condition of the hydraulic braking pressure are as shown in FIGS. 3(h) and respectively. The energization and deenergization of the solenoid $4_{LFS}$ or $4_{RFS}$ and the energization and deenerigzation of the solenoid $5_{LFS}$ or $5_{RFS}$ are as shown in FIGS. 3(j) and 3(k), respectively, and the braking force of the drive wheel brake device $B_{LF}$ or $B_{RF}$ is as shown in FIG. 3(l). In FIGS. 3(h) to 3(k), a high level indicates the energization, and a low level indicates the deenergization. In FIGS. 3(j) and 3(k), an intermediate level indicates a condition where the energization and deenergization are intermittently switched over. In FIG. 3(h), a high level of the solenoid $6_S$ indicates a closed state of the normally-opened solenoid valve 6, and in FIG. 3(i), a high level of the solenoid $7_S$ indicates an opened state of the normally-closed solenoid valve 7. In FIG. 3(j), a high level of the solenoid $4_{LFS}$ or $4_{RFS}$ indicates a closed state of the inlet solenoid valve $4_{LF}$ or $4_{RF}$, and an intermediate level of the solenoid $4_{LFS}$ or $4_{RFS}$ indicates a condition where the inlet solenoid valve $4_{LF}$ or $4_{RF}$ is intermittently opened and closed. In FIG. 3(k), a high level of the solenoid $5_{LFS}$ or $5_{RFS}$ indicates an open state of the outlet solenoid valve $5_{LF}$ or $5_{RF}$, and an intermediate level of the solenoid $5_{LFS}$ or $5_{RFS}$ indicates a condition where the outlet solenoid valve $5_{LF}$ or $5_{RF}$ is intermittently opened and closed.

When the left drive wheel velocity $V_{WLF}$ exceeds the higher-side reference velocity $V_{RH}$ and the left drive wheel acceleration or deceleration $\alpha_{WL}$ exceeds the reference acceleration $\alpha_H$, the outputs from the comparators $23_L$ and $25_L$ become a high level, and on the assumption that the left drive wheel enters an excessive slipping tendency, a high level signal is produced from the AND circuit $27_L$.

This causes the solenoids $6_S$ and $7_S$ to be energized, thereby closing the traction-controlling normally-opened solenoid valve 6 and opening the traction-controlling normally-closed solenoid valve 7. In this case, when the vehicle speed $V_R$ is equal to or less than the reference vehicle speed $V_{RO}$ the output from the AND circuit 46 is of a high level for the given time $T_3$ from a point when the above-described excessive slipping tendency occurs. When the excessive slipping tendency continues while the output from the AND circuit 46 is of a high level, the output from the AND circuit $40_L$ is of a high level. Hence, the output from the AND circuit $36_L$ is of a low level and the solenoid $4_{LFS}$ remains deenergized. In addition, during this time, each of the outputs from the comparators $24_L$ and $26_L$ is of a low level, and the output from the OR circuit $37_L$ is also of a low level and hence, the solenoid $5_{LFS}$ is also in its deenergized state. This results in the rapid increase mode, so that the hydraulic pressure from the hydraulic pressure supply source 2 can be rapidly applied to the hydraulic braking pressure chamber 10 in the drive wheel brake device $B_{LF}$ to rapidly increase the braking force, thereby providing an improvement in responsiveness of the traction control.

Moreover, the output from the timer 45 becomes a low level after a lapse of the given time $T_3$ (e.g., 60m sec.) from a point when the excessive slipping tendency occurs. In response thereto, the output from the AND circuit $40_L$ also becomes a low level, so that the control of the braking force in the rapid increase mode is carried out only for the given time $T_3$ from the point when the drive wheel enters an excessive slipping tendency.

The control of the braking force in the rapid increase mode is performed at an initial stage of the traction control only when the vehicle speed is equal to or less than the reference vehicle speed $V_{RO}$ (e.g., 15 to 20 km/hr). This is for the purpose of providing a slow increase in braking force to provide a moderation of a vibration of the vehicle body, taking great account of stability in a higher velocity region exceeding the reference vehicle velocity $V_{RO}$, because when the left and right drive wheels are independently controlled, there is a possibility that the braking forces of the left and right wheel brake devices $B_{LF}$ and $B_{RF}$ may be alternately increased to produce a vibration of the vehicle body, if the phases of the left and right wheels are displaced. When the control of the engine power output and the control of braking force are used in combination, and if the control of the braking force in the rapid increase mode is prohibited in the rapid increase in the higher speed region as described above, it is ensured that in such a high speed region where the engine power output is stable at a level more than a predetermined value and the output is controllable, the contribution of the control of the braking force can be lowered to prevent the occurrence of any excessive control and any abnormal behavior of the vehicle body.

When the left drive wheel acceleration or deceleration $\alpha_{WL}$ becomes a relation of $\alpha_H \geq \alpha_{WL} > \alpha_L$ as a result of the control of the braking force in the rapid increase mode in a condition where the left drive wheel speed $V_{WLF}$ exceeds the higher-side reference speed $V_{RH}$, the output from the AND circuit $27_L$ becomes a low level. When the right drive wheel is not in the excessive slipping tendency, the output from the OR circuit 41 becomes a lower level, but the output from the OR circuit 43 is of a high level until the given time $T_2$ is elapsed by the operation of the timer 42, so that the energization of the solenoids $6_S$ and $7_S$ is sustained. Then, the output from the AND circuit $40_L$ becomes a low level and in response thereto, the output from the OR circuit $36_L$ becomes a high level, thereby energizing the solenoid $4_{LFS}$ to close the inlet solenoid valve $4_{LF}$.

This results in the maintaining mode in which the solenoids $4_{LFS}$ and $4_{RFS}$ are energized and the solenoids $5_{LFS}$ and $5_{RFS}$ are deenergized to close the inlet solenoid valves $4_{LF}$ and $4_{RF}$ and the outlet solenoid valves $5_{LF}$ and $5_{RF}$, so that the hydraulic pressure in the hydraulic braking pressure chamber 10 is maintained to keep the braking force of the brake device $B_{LF}$.

When the left drive wheel speed $V_{WLF}$ exceeds the higher-side reference speed $V_{RH}$, but $\alpha_{WL} < \alpha_L$ as a result of the control of the braking force in the maintaining mode, the control of the braking force is carried out in the rapid decrease mode. More specifically, the condition in which the left drive wheel speed $V_{WL}$ exceeds the higher-side reference speed $V_{RH}$ is basically a condition in which a substantial slipping occurs in the drive wheel and intrinsically, the braking force should be increased, but such condition can be predicted as being a condition in which an excessive braking force overcoming a great driving force acts from the fact that $\alpha_{WL} < \alpha_L$. In such condition, the output from the AND circuit $28_L$ becomes a high level in response to the output from the comparator $26_L$ becoming a high level, and the output from the OR circuit $37_L$ becomes a high level, thereby energizing the solenoid $5_{LFS}$ to open the outlet solenoid valve $5_{LF}$. This permits the hydraulic pressure in the hydraulic braking pressure chamber 10 in the brake device $B_{LF}$ to be rapidly released, so that the braking force is rapidly reduced.

When the left drive wheel speed $V_{WLF}$ becomes equal to or less than the higher-side reference speed $V_{RH}$ as a result of the control of the braking force in the rapid decrease mode, the control of the braking force in the slow decrease mode is carried out in a region in which the left drive wheel acceleration or deceleration $\alpha_{WL}$ is less than the reference deceleration $\alpha_L$.

More specifically, in the region of $V_{RL} < V_{WLF} \leq V_{RH}$, in principle, the wheel is in an ideal slipping state and in this case, intrinsically, the braking force should be maintained, but it can be predicted that the establishment of the relation, $\alpha_{WL} < \alpha L$ is because a slightly excessive braking force acts, as compared to in the rapid decrease mode. In such region, in response to the output from the comparator $26_L$ becoming a high level, the high level signal from the AND circuit $32_L$ is supplied to the oscillator circuit $33_L$ and in response thereto, high and low level signals from the OR circuit $37_L$ are alternately outputted in a given cycle, thereby intermittently energizing the solenoid $5_{LFS}$. This causes the outlet solenoid valve 5 to be intermittently opened and closed, so that the hydraulic pressure in the hydraulic braking pressure chamber 10 is slowly released, thereby slowly decreasing the braking force of the left drive wheel brake device $B_{LF}$.

Then, when the left drive wheel velocity $V_{WL}$ becomes equal to or less than the lower-side reference speed velocity $V_{RL}$, the left drive wheel is brought into an ideal slipping state, i.e., a condition displaced from a target region of the traction control intended to achieve the relation $V_{RL} < V_{WLF} < V_{RH}$. As apparent, it is surmised that an excessive braking force acts in this condition. In this case, the output from the comparator $24_L$ becomes a high level and hence, the solenoid $5_{LFS}$ is intermittently energized in the same manner as described above, whereby intermittent opening and closing of the outlet solenoid valve $5_{LF}$ are continued to sustain a condition in which the braking force of the left drive wheel brake device is slowly decreased.

When $V_{WLF} > V_{RL}$ as a result of the above-described slow decrease of the braking force, the output from the comparator $24_L$ becomes a low level and hence, the output from the AND circuit $32_L$ also becomes a low level, so that the solenoid $5_{LFS}$ is deenergized to close the outlet solenoid valve $5_{LF}$, and the control of the braking force is carried out in the maintaining mode.

Moreover, the control of the braking force in the slow decrease mode and the maintaining mode is ensured by the operation of the timer $30_L$.

When the left drive wheel enters the excessive slipping tendency again, so that the left drive wheel velocity $V_{WLR}$ exceeds the higher-side reference speed $V_{RH}$ and at the same time, the left drive acceleration or deceleration $\alpha_{WL}$ exceeds the reference acceleration $\alpha_H$, the control of the braking force is turned to the slow increase mode. More specifically, after a lapse of the given time $T_3$ from the point of initial occurrence of the excessive slipping tendency, the AND circuit 46 produces a low level output and hence, the OR circuit 35 repeatedly produces high and low level signals in a given cycle, so that the solenoid $4_{LFS}$ is intermittently energized to intermittently open and close the inlet solenoid valve $4_{LF}$, thereby permitting the hydraulic pressure in the hydraulic braking pressure chamber 10 in the left drive wheel brake device $B_{LF}$ to be slowly increased to slowly increase the braking force.

When the given time $T_1$ (e.g., 500m sec.) is elapsed after the left and right drive wheel speeds $V_{WLF}$ and $V_{WRF}$ become equal to or less than the higher-side reference velocity $V_{RH}$, the timer 42 is reset and hence, when the excessive slipping tendency is eliminated before the given time $T_2$ is elapsed after occurrence of the excessive slipping tendency, the solenoids $6_S$ and $7_S$ are deenergized to open the traction-controlling normally-opened solenoid valve 6 and close the traction-controlling normally-closed solenoid valve 7, ensuring that the hydraulic pressure of both drive wheel brake devices $B_{LF}$ and $B_{RF}$ can be properly controlled in response to the operation of rapidly returning the accelerator or the conducting of braking.

Such a series of controls of the braking force is repeated in accordance with the left drive wheel speed $V_{WLF}$ and the left drive wheel acceleration or deceleration $\alpha_{WL}$, thereby eliminating the excessive slipping tendency of the left drive wheel.

At an initial stage of the traction control, the control of the braking force is conducted in the rapid increase mode and when the braking force is subsequently increased, the control of the braking force is conducted in the slow increase mode. Therefore, it is possible to avoid a reactive consumption of the hydraulic braking pressure to provide a good responsive traction control.

Further, when an excessive braking force acts during the traction control, it is necessary to reduce the braking force, wherein the control of the braking force is carried out in the rapid and slow reduction modes switched over one to another in accordance with the degree of excess. Thus, it is possible to provide an appropriate traction control according to the situation. The above-described control of the braking force is also likewise performed with regard to the right drive wheel. In spite of the same phase or different phases of the left and right wheels, the controls of the braking force for the left and right drive wheels are independently carried out.

We claim:

1. A method for traction control of a vehicle, comprising the steps of:

detecting a slipping tendency of a drive wheel caused due to application of a drive force to said drive wheel; and, controlling a braking force of ad rive wheel brake device to be applied to said drive wheel in an increasing and decreasing manner in accordance with a degree of the detected slipping tendency, wherein a rapid increase mode of rapidly increasing the braking force of the drive wheel brake device and a slow increase mode of slowly increasing the braking force is switchable from one to the other, so that at an initial stage of increasing the braking force of the drive wheel brake device on the basis of a decision that the drive wheel is in an excessive slipping tendency, the braking force is increased in the rapid increase mode, and wherein the step of controlling the brake force in the rapid increase mode is performed only at a vehicle speed less than a predetermined reference vehicle speed;

wherein the rapid increase mode is performed for a predetermined period of time as a maximum duration, and this rapid increase mode is interrupted prior to expiration of said predetermined period of time when either of the following two conditions is established:

(a) when a wheel speed of said drive wheel falls below a predetermined reference speed which is set higher than said vehicle speed; or (b) when an acceleration/deceleration of said drive wheel falls below a predetermined reference acceleration.

2. The method of traction control of a vehicle of claim 1, wherein the reference vehicle speed is 20 kph.

3. The method of traction control of a vehicle of claim 1, wherein said controlling step also includes maintaining the braking force of the drive wheel device in a maintaining mode in order to maintain pressure in the brake device.

4. A method for traction control of a vehicle, comprising the steps of:

detecting a slipping tendency of a drive wheel caused due to application of a drive force to said drive wheel;

determining said slipping tendency to be one of an excessive slipping tendency and a non-excessive slipping tendency;

selecting a combination of solenoids to be energized out of a series of solenoids;

energizing said combination of solenoids in response to a determination of one of the excessive and the non-excessive slipping tendencies;

wherein in the non-excessive slipping tendency said combination is selected to apply a braking force to a drive wheel brake device in an increasing and decreasing manner in a slow increase mode, and in the excessive slipping tendency a different combination is selected to act to increase and decrease said braking force to said brake device in a rapid increase mode;

wherein said slow increase mode is selected wherever said drive wheel exceeds a predetermined higher side reference speed and a drive wheel acceleration or deceleration exceeds a predetermined reference acceleration; and, wherein said step of detecting the slipping tendency of the drive wheel is performed for front side and rear side of a vehicle individually for each other.

5. A method for traction control of a vehicle, comprising the steps of:

detecting a slipping tendency of a drive wheel caused due to application of a drive force to said drive wheel; and, controlling a braking force of a drive wheel brake device to be applied to said drive wheel in an increasing and decreasing manner in accordance with a degree of the detected slipping tendency, wherein a rapid increase mode of rapidly increasing the braking force of the drive wheel brake device and a slow increase mode of slowly increasing the braking force is switchable from one to the other, so that at an initial stage of increasing the braking force of the drive wheel brake device on the basis of a decision that the drive wheel is in an excessive slipping tendency, the braking force is increased in the rapid increase mode, and wherein the step of controlling the brake force in the rapid increase mode is performed only at a vehicle speed less than a predetermined reference vehicle speed, and wherein said controlling step turns the control of the braking force to the slow increase mode when the drive wheel returns to such a slipping tendency that the drive wheel exceeds a predetermined higher-side reference speed, and that a drive wheel acceleration or deceleration exceeds a predetermined reference acceleration.

* * * * *